(12) United States Patent
Koeppe

(10) Patent No.: US 7,760,465 B2
(45) Date of Patent: Jul. 20, 2010

(54) MAGNETIC HEAD HAVING SELECTIVELY DEFINED READER GAP THICKNESSES

(75) Inventor: Peter VanderSalm Koeppe, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 11/259,618

(22) Filed: Oct. 25, 2005

(65) Prior Publication Data

US 2007/0091505 A1 Apr. 26, 2007

(51) Int. Cl.
G11B 5/29 (2006.01)

(52) U.S. Cl. .................. 360/121; 360/314; 360/315; 360/316

(58) Field of Classification Search ............ 360/121, 360/314–316
See application file for complete search history.

(56) References Cited

U.S. PATENT DOCUMENTS

| | | | | |
|---|---|---|---|---|
| 4,551,777 A * | 11/1985 | Saito et al. | ............... | 360/77.11 |
| 4,918,972 A * | 4/1990 | Kenny et al. | ................. | 73/1.79 |
| 4,933,795 A * | 6/1990 | Nigam | ........................ | 360/121 |
| 5,003,412 A * | 3/1991 | Bizjak et al. | ............. | 360/77.01 |
| 5,041,936 A * | 8/1991 | Hayakawa | .................. | 360/121 |
| 5,122,917 A * | 6/1992 | Spainger | ................ | 360/125.35 |
| 5,181,150 A * | 1/1993 | Hayakawa et al. | .......... | 360/121 |
| 5,218,755 A * | 6/1993 | Gassen et al. | ............ | 29/603.09 |
| 5,398,145 A * | 3/1995 | Jeffers et al. | ............. | 360/77.12 |
| 5,432,652 A | 7/1995 | Comeaux et al. | ......... | 360/77.12 |
| 5,530,608 A * | 6/1996 | Aboaf et al. | ................ | 360/316 |
| 5,568,331 A * | 10/1996 | Akagi et al. | ............. | 360/77.07 |
| 5,574,602 A | 11/1996 | Baca et al. | ................ | 360/77.12 |
| 5,713,122 A | 2/1998 | Aboaf et al. | ............. | 29/603.08 |
| 5,726,842 A * | 3/1998 | Mori et al. | ............. | 360/125.01 |
| 5,745,978 A | 5/1998 | Aboaf et al. | ............. | 29/603.08 |
| 5,855,056 A * | 1/1999 | Cates | ...................... | 29/603.14 |
| 5,995,337 A * | 11/1999 | Kira | ........................... | 360/316 |
| 6,038,108 A | 3/2000 | Dee et al. | ................... | 360/121 |
| 6,320,719 B1 | 11/2001 | Albrecht et al. | .......... | 360/77.12 |
| 6,344,951 B1 * | 2/2002 | Sato et al. | ................... | 360/316 |
| 6,344,952 B1 * | 2/2002 | Biskeborn et al. | ........... | 360/319 |
| 6,356,410 B1 * | 3/2002 | Chesnutt et al. | ........ | 360/125.41 |
| 6,363,210 B1 * | 3/2002 | Owashi et al. | ................ | 386/94 |
| 6,452,757 B1 * | 9/2002 | Yang et al. | .................. | 360/317 |
| 6,697,208 B2 * | 2/2004 | Adams et al. | ................. | 360/75 |
| 6,781,784 B2 * | 8/2004 | Peterson | ...................... | 360/76 |
| 2002/0048114 A1 * | 4/2002 | Dirne et al. | ................. | 360/110 |
| 2002/0186505 A1 | 12/2002 | Biskeborn et al. | ........... | 360/129 |
| 2004/0057162 A1 * | 3/2004 | Gill | ............................. | 360/314 |
| 2005/0007700 A1 * | 1/2005 | Nagai | ...................... | 360/241.1 |
| 2005/0018349 A1 * | 1/2005 | Eaton | .......................... | 360/129 |
| 2006/0209450 A1 * | 9/2006 | Saliba | ........................... | 360/75 |

FOREIGN PATENT DOCUMENTS

| | | |
|---|---|---|
| CN | 1091219 | 8/1994 |
| EP | 0 427 008 B1 | 7/1997 |

* cited by examiner

*Primary Examiner*—William J Klimowicz
*Assistant Examiner*—Carlos E Garcia
(74) *Attorney, Agent, or Firm*—Zilka-Kotab, PC

(57) ABSTRACT

A magnetic head includes a plurality of generally laterally positioned readers, each reader having a sensor, a lower shield below the sensor, an upper shield above the sensor, and a gap defined between the shields. At least one of the readers has a thicker gap than another of the readers. Methods for making such heads are also presented.

19 Claims, 16 Drawing Sheets

MAGNETIC HEAD HAVING SELECTIVELY DEFINED READER GAP THICKNESSES

FIELD OF THE INVENTION

The present invention relates to magnetic heads, and more particularly, this invention relates to magnetic heads having independently defined reader gap thicknesses.

BACKGROUND OF THE INVENTION

Business, science and entertainment applications depend upon computing systems to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

Tape drive systems for linear tape formats such as Linear Tape Open (LTO) typically have one or two heads, each head having an array of transducers for writing to and reading from the tape. For example, a state-of-the-art multichannel tape magnetic recording head today contains 16 data channels and 2 servo reader channels in each of two bidirectional modules. Current practice is to fabricate the servo reader channels using the same shield-to-shield gap dimensions as those in the data reader channels, as this minimizes fabrication costs.

The improvement in magnetic medium data storage capacity arises in large part from improvements in the magnetic head's reading and writing transducers used for reading and writing data on the magnetic storage medium. A major improvement in transducer technology arrived with the magnetoresistive (MR) sensor originally developed by the IBM® Corporation. The MR sensor transduces magnetic field changes in an MR stripe to resistance changes, which are processed to provide digital signals. Data storage density can be increased because an MR sensor offers signal levels higher than those available from conventional inductive read heads for a given bit area. Moreover, the MR sensor output signal depends only on the instantaneous magnetic field intensity in the storage medium and is independent of the magnetic field time-rate-of-change arising from relative sensor/medium velocity.

The quantity of data stored on a magnetic tape may be increased by increasing the number of data tracks across the tape, which also decreases the distance between adjacent tracks and forces key dimensions of read/write heads to be physically smaller. More tracks are made possible by reducing feature sizes of the read and write elements, such as by using thin-film fabrication techniques and MR sensors.

Similarly, as technology advances, the data reader gaps continue to be optimized to thinner dimensions, providing for detection of higher linear densities of magnetic transitions along the tape. Meanwhile, the linear density of servo tracks on tape is typically unchanged over the various generations of a family of products, and often is more than a factor of 10 lower than the data channel linear density. Also, the trend is toward thinner magnetic coatings on tape, again optimizing data channel characteristics but compromising servo channel signal amplitudes, especially with low density signals and the trend toward decreasing reader gaps. Using the same thin gap in the servo reader channel transducers as the data readers results in both suboptimal performance for the servo channels (in the form of undesirably low signal amplitudes due to the unnecessary thinness of the gaps) and increases reliability concerns for the servo channels, e.g., increased risk of shorting between the MR sensor and metallic magnetic shield (if, for example, a scratch occurs) due to the unnecessary thinness of the gaps.

One proposed solution to the problems described above is to build multiple read channels separately rather than simultaneously. However, such heads are much more expensive to fabricate than heads where all reader channels are created simultaneously.

Another proposed solution includes writing servo-written tape using more elaborate means to increase servo amplitude, e.g., bipolar servo patterns and/or DC erased tracks. However, implementation of these new servo patterns require new servo writing hardware for tape manufacture as well as modified signal detection algorithms in the tape drives.

There is accordingly a clearly-felt need in the art for a magnetic head assembly with definable reader gaps selected to optimize performance and/or reliability. These unresolved problems and deficiencies are clearly felt in the art and are solved by this invention in the manner described below.

SUMMARY OF THE INVENTION

A magnetic head includes a plurality of generally laterally positioned readers, each reader having a sensor, a lower shield below the sensor, an upper shield above the sensor, and a gap defined between the shields. At least one of the readers has a thicker gap than another of the readers.

A tape drive system includes a head such as the head recited above, a drive mechanism for passing a magnetic recording tape over the head, and a controller in communication with the head. The system may further include an outer tape guide for setting a wrap angle of the tape relative to the second (outrigger) tape bearing surface.

Methods for making such heads are also presented. A method for fabricating a magnetic head having multiple readers according to one embodiment includes forming a plurality of generally laterally-positioned lower shields, forming a lower gap layer above each lower shield, forming a sensor above each lower gap layer, forming an upper gap layer above each sensor, and forming an upper shield above each upper gap layer, where the overall gap thickness of one reader is greater than the overall gap thickness of another reader.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
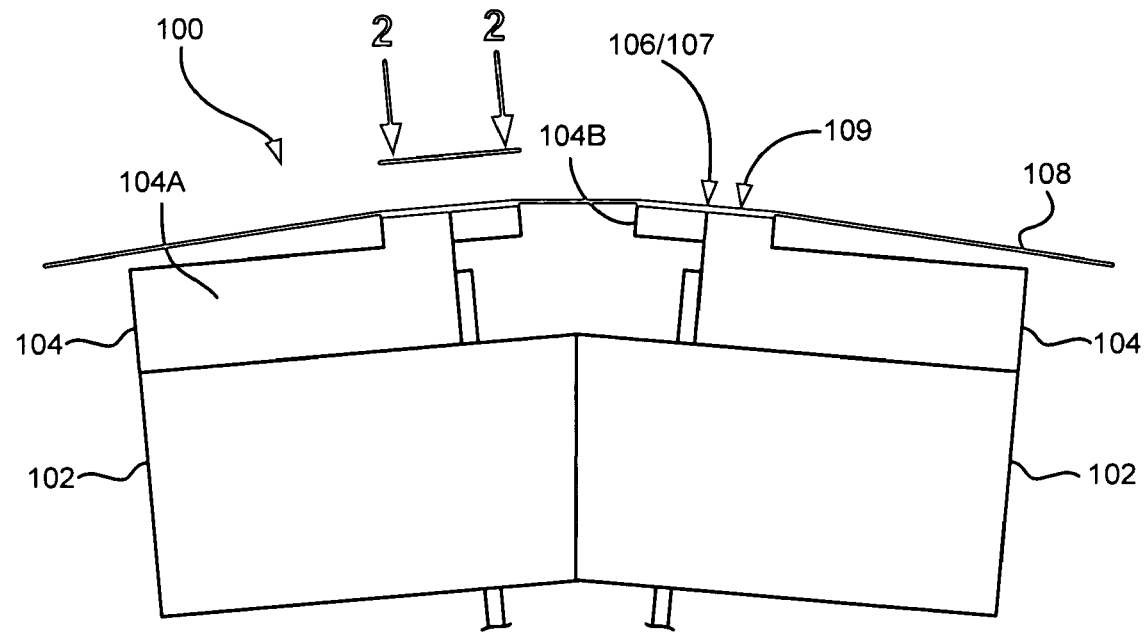
FIG. 1 is a side view of a flat-lapped magnetic tape head, in accordance with one embodiment.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

The present invention provides a mechanism for optimizing multiple read channels of different varieties on a magnetic recording head uniquely for performance, reliability, and/or thermal characteristics, while still building (fabricating) the multiple readers simultaneously. For example, some embodiments of this invention provide increased signal amplitude and increased protection against shorting in some channels contained in advanced multichannel narrow gap recording heads, where the gap of these channels do not require the narrowest gap of the population of channels in that head.

The magnetic heads of this invention have multiple reader channels deposited simultaneously as shielded magnetoresistive transducers (e.g., GMR devices, Anisotropic Magnetoresistive (AMR) devices, Tunneling Magnetoresistive (TMR) devices, etc.). The deposited nonmagnetic gaps to each shield (upper and lower) of each transducer (channel) may be of different thicknesses in order to optimize that channel's characteristics.

Varying gap size is important for performance characteristics, such as for reading a particular linear density. A smaller gap is desirable for reading a tape with a high linear data density because the resolution of the reader is finer. However, a reader with a larger gap provides a stronger signal (higher amplitude) and a higher Signal to Noise (S/N) ratio as compared to a reader with a smaller gap when reading lower linear densities. During experimentation, the inventor has surprisingly observed a higher S/N ratio when reading low linear density patterns from tape than was expected from the increase in amplitude.

While not wishing to be bound by any theory, the inventor believes that the higher S/N ratio is due both to increased signal amplitude (numerator, S) and decreased noise (denominator, N), the latter likely due to averaging of magnetic transition noise with the larger gap.

A higher amplitude is also desirable for such things as reading the servo track on the tape. For example, the servo pattern used on tapes may be the same from format family to format family, e.g., LTO 1 to LTO 2 may use the same servo pattern, though the linear data density of the data tracks may have increased. In one particularly beneficial embodiment, the gaps of the servo readers are thicker than the gaps of the data readers, providing increased signal amplitude and increased reliability (e.g., protection from shorting) in the servo readers, while having the high data resolution provided by the narrow gaps of the data readers.

An additional benefit is that reliability is increased, in that a thicker gap can be created where a thinner gap is not needed, thereby reducing the probability of shorting due to processing variations and irregularities, deposition of debris during use, etc. This in turn makes the overall head more reliable.

Additionally, a smaller gap tends to dissipate heat more rapidly than a thicker gap. Thus the present invention allows optimization of the heat transfer characteristics of the particular reader by allowing selection of gap thickness.

FIG. 1 illustrates a flat-lapped bi-directional, two-module magnetic tape head 100, in accordance with one embodiment of the present invention. As shown, the head includes a pair of bases 102, each equipped with a module 104. The bases are typically "U-beams" that are coupled together, for example adhesively coupled together. Each module 104 includes a substrate 104A and a closure 104B with readers 106 and writers 107 situated therebetween. The head 100 may include 8, 16 or more data channels and one, two or more servo reader channels in each of the two bidirectional modules 104.

In use, a tape 108 is moved over the modules 104 along a tape bearing surface 109 of each module 104 for reading and writing data on the tape 108 using the readers 106 and writers 107. The tape 108 typically includes several data bands positioned laterally across the width of the tape, each data band having one or more servo tracks and a plurality of data tracks.

Figure 2:
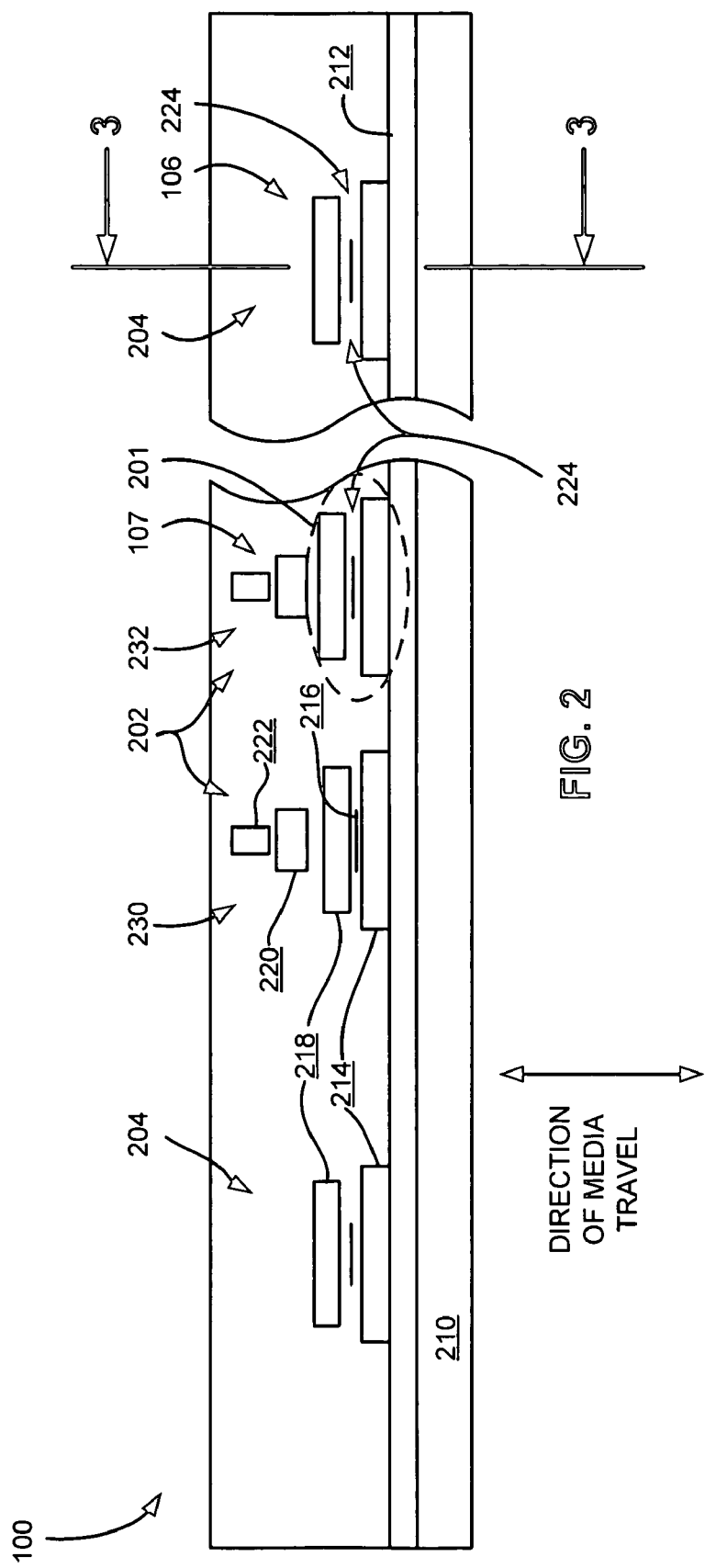
FIG. 2 is a partial tape bearing surface view taken from Line 2 of FIG. 1.

FIG. 2 is a detailed view of the head 100 of FIG. 1, which has several data reader and writer pairs 202 (R/W pairs) matched in a "piggyback" configuration and aligned generally laterally in a direction perpendicular to the direction of tape travel. It should be noted that although two R/W pairs are shown in FIG. 2, head 100 may include more or less than two R/W pairs. Servo readers 204 are positioned on the outside of the array of R/W pairs 202. The servo readers 204 follow servo tracks on a tape being read or written to, their signal being used to keep the head aligned with a particular data band.

With continued reference to FIG. 2, when the head 100 is constructed, layers are formed on a substrate 210 in generally the following order for the R/W pairs 202: an electrically insulative layer 212, a lower shield 214 formed above the insulative layer 212, a sensor 216 also known as a read element, and an upper shield 218, and first and second writer pole tips 220, 222. Note also that the upper shield 218 and first writer pole tip 220 may be merged into a single structure. The sensor 216 is tucked in the gap 224 formed between and defined by the upper and lower shields 218, 214. The overall gap thickness is defined between the shields 214, 218.

As mentioned above, it may be desirable that the servo readers 204 have a thicker gap than the data readers 201 to increase the S/N ratio in the servo channels while achieving high linear data resolution in the data channels. Accordingly, in for example the head 100 shown in FIG. 2, the overall gaps 224 of the servo readers 204 are thicker than the overall gaps 224 of the data readers 201.

In embodiments where the servo reader gaps are thicker than the data reader gaps, the particular overall gap thickness of each type of reader depends upon the desired performance, reliability, and thermal benefits desired. As a general parameter in accordance with certain embodiments of the present invention, the thickness of the servo reader gap may be about 1.1 times the thickness of the data reader gap, and preferably 1.5 times the thickness of the data reader gap (3:2 gap thickness ratio), or greater. For example, in some present data formats, the servo to data linear density ratio is greater than about 10:1. A head for reading the tape according to an illustrative embodiment may have a data reader gap of about 0.15 to about 0.30 microns, while the servo reader gap is in the range of about 0.30 to about 0.50 microns. The inventor has found that even though the servo to data linear density ratio is greater than about 10:1 but the gap thickness ratio is less than 2:1, the thicker servo reader gap provides a huge performance benefit in terms of amplitude and S/N ratio. One practicing the invention should understand that these parameters are provided by way of example only and other ratios and thicknesses can be used. For instance, if the data reader gap decreases in future systems, the servo reader gap may also decrease, but the gap thickness ratio may actually increase to, e.g., 2:1 or higher.

The data readers 201 may also have individually varying gap widths. With continued reference to FIG. 2, the data reader 201 of R/W pair 232 has a thicker gap than the data reader 201 of R/W pair 230. Accordingly, the gap thickness of any of the readers can be individually defined. Methods for defining the reader gap thicknesses are presented below.

Figure 3:
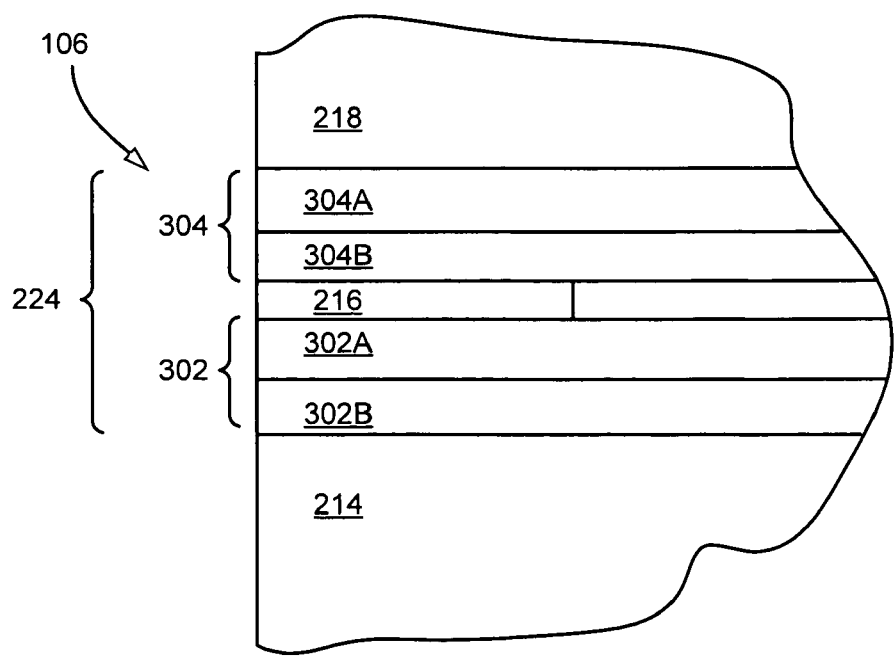
FIG. 3 is a partial cross sectional view taken from Line 3 of FIG. 2.

Referring to FIG. 3, the gap 224 itself includes a lower gap layer 302 positioned between the sensor 216 and the lower shield 214, and an upper gap layer 304 positioned between the sensor 216 and the upper shield 218. The lower gap layer 302 may be a multilayer structure, e.g., having two gap layers 302A, 302B. Likewise, the upper gap layer 304 may be a multilayer structure, e.g., having two gap layers 304A, 304B. Whether either or both of the gap layers 302, 304 is a multilayer structure depends on the method of fabricating the gap layers, as will soon become apparent.

The gap material is a nonmagnetic material, and is typically electrically insulative. The same gap material may be used throughout the overall gap so that the coefficient of thermal expansion of the gap layers is the same. However, different materials may be used for the various gap layers and sublayers. For instance, in the thicker gaps, a nonmagnetic metal layer (e.g., Ta, Cu, Au) may be used adjacent one or both shields, but electrically isolated therefrom. Assuming the metal gap layers have a higher thermal conductivity than the adjacent dielectric gap layers, the metal gap layers improve heat transfer from the sensor.

Figure 4:
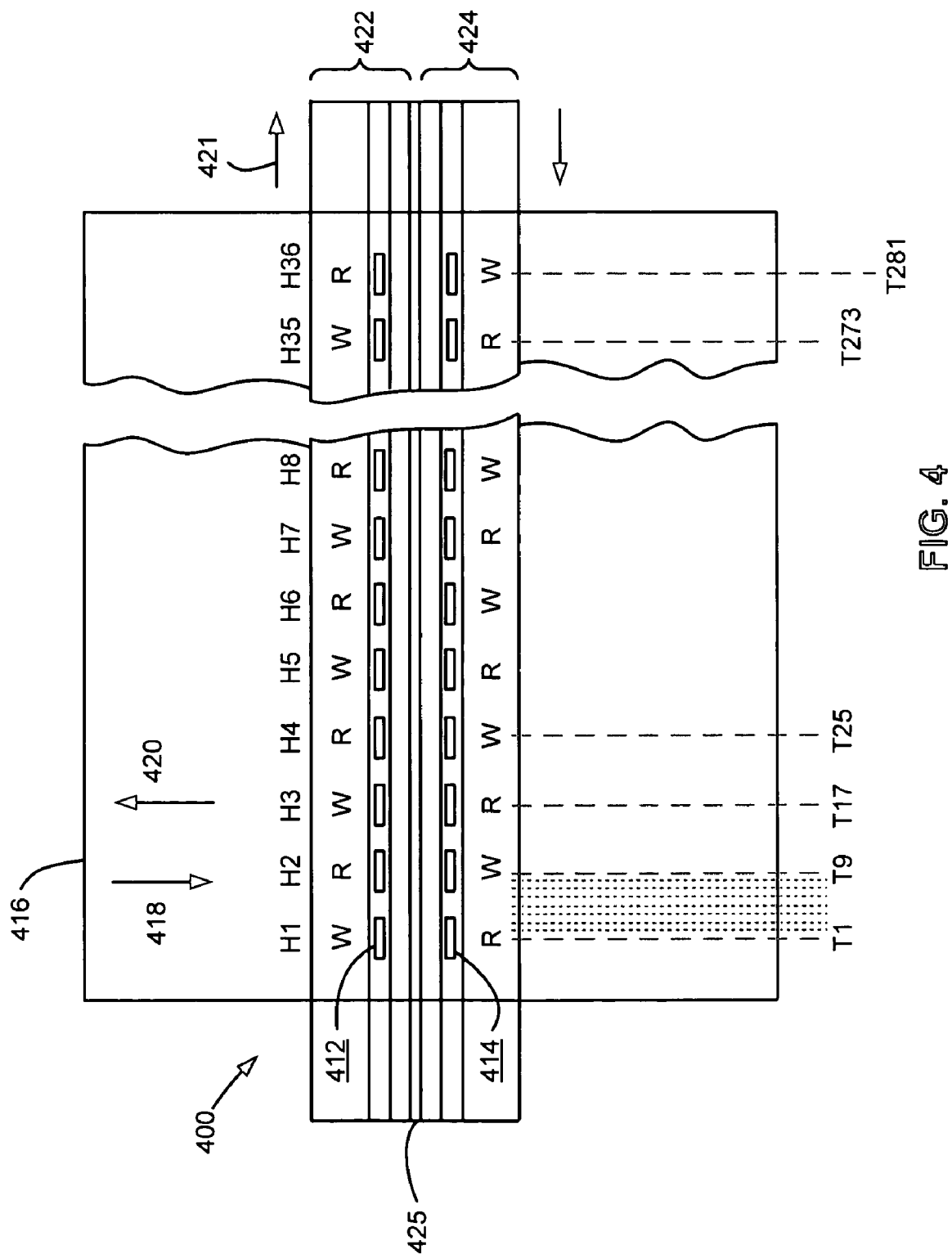
FIG. 4 illustrates a partial tape bearing surface view of an interleaved magnetoresistive (MR) head assembly in relation to a magnetic tape storage medium.

FIG. 4 illustrates an MR interleaved head assembly 400 according to another embodiment of the present invention. The readers 414 are marked "R" and the writers 412 are marked "W". The readers 414 generally have the same basic structure as those shown in FIGS. 2-3, i.e., upper and lower shields, a gap therebetween, and a sensor in the gap.

With continued reference to FIG. 4, the readers 414 and writers 412 are disposed in alternating fashion to form a single set of thirty-eight (for example) read/write track-pairs, exemplified by the R/W track-pair 412-414. As used herein, the term "alternating" is intended to include different formats. For example, one format provides that the odd-numbered heads H1, H3, H5 . . . H35 are operative during forward tape movement, while the even-numbered heads H2, H4, H6 . . . H36 are operative during the opposite direction of tape movement.

Generally, magnetic tape medium 416 moves in either a forward or reverse direction as indicated by the arrows 418 and 420. Head assembly 400 is shown in FIG. 4 as if magnetic tape medium 416 were transparent, although such tape medium normally is not transparent. Arrow 418 designates a forward movement of tape medium 416 and arrow 420 designates a reverse direction. Magnetic tape medium 416 and interleaved MR head assembly 400 operate in a transducing relationship in the manner well-known in the art. Other formats usable in the practice of this invention are considered to be within the teaching of this invention.

Each of the head elements in head assembly 400 is intended to operate over a plurality of data tracks in magnetic tape medium 416, as may be appreciated with reference to the data tracks T1, T9, T17, . . . T281 in FIG. 4, which shows an exemplary 281-track scheme having a data track density on magnetic tape medium 416 of eight times the recording element density of R/W track-pairs H1, H2, . . . H36 in MR head assembly 400. Tracks T9, T25, . . . T281 may be written with one pass of magnetic tape medium 416 in direction 418 over even-numbered R/W track-pairs H2, H4, . . . H36 and then tracks T1, T17, . . . T273 written on a return pass of magnetic tape medium 416 over the odd-numbered R/W track-pairs H1, H3, . . . H35 by moving the lateral position of MR head assembly 400 in the direction of the arrow 421 by a distance equivalent to one track pitch, which in this example is about 12% of the R/W track-pair spacing (H1-H2). Interleaved MR head assembly 400 includes two thin-film modules 422 and 424 of generally identical construction that are coupled together, for example by an adhesive layer 425.

Figure 5:
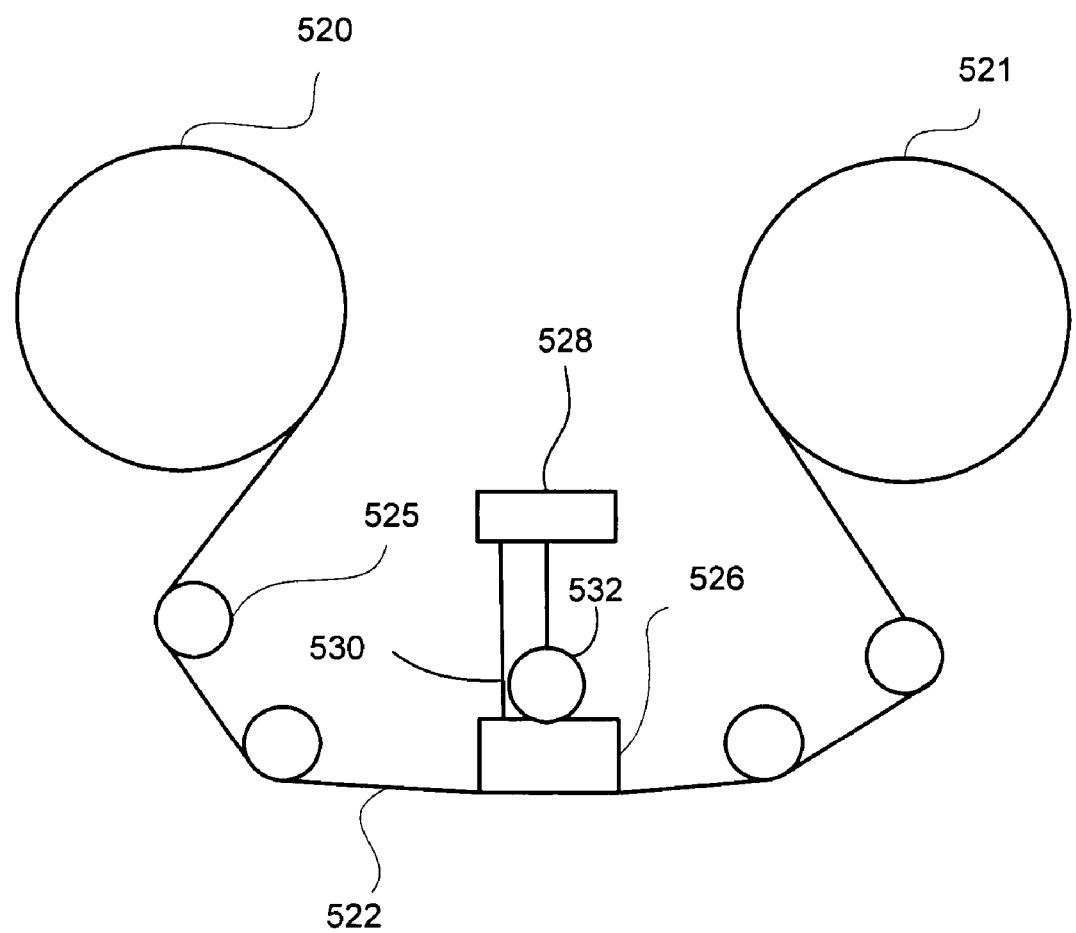
FIG. 5 is a schematic diagram of the tape drive system.

FIG. 5 illustrates a simplified tape drive which may be employed in the context of the present invention. While one specific implementation of a tape drive is shown in FIG. 5, it should be noted that the embodiments of the previous figures may be implemented in the context of any type of tape drive system.

As shown, a tape supply cartridge 520 and a take-up reel 521 are provided to support a tape 522. These may form part of a removable cassette and are not necessarily part of the system. Guides 525 guide the tape 522 across a preferably bidirectional tape head 526, of the type disclosed herein. Such tape head 526 is in turn coupled to a controller assembly 528 via an MR connector cable 530. The controller 528, in turn, controls head functions such as servo following, write bursts, read functions, etc. An actuator 532 controls position of the head 526 relative to the tape 522.

A tape drive, such as that illustrated in FIG. 5, includes drive motor(s) to drive the tape supply cartridge 520 and the take-up reel 521 to move the tape 522 linearly over the head 526. The tape drive also includes a read/write channel to transmit data to the head 526 to be recorded on the tape 522 and to receive data read by the head 526 from the tape 522. An interface is also provided for communication between the tape drive and a host (integral or external) to send and receive the data and for controlling the operation of the tape drive and communicating the status of the tape drive to the host, all as will be understood by those of skill in the art.

The following description discloses several methods for creating the heads presented above. As mentioned above, it is desirable to be able to build all of the readers simultaneously. The following methods allow formation of readers having selectively defined gap thicknesses in the same processing sequence. These methods assume that the servo readers will have thicker gaps than the data readers. It should be understood by those of skill in the art that the same general methods would apply to creating data readers of varying gap thickness by performing the steps described with reference to the servo readers on selected data readers.

FIGS. 6A-H illustrate processing steps performed during a method for forming an array of readers according to one embodiment of the present invention. According to this method, multi-layer thin film gaps are deposited on each side of each sensor in such a way that the desired thicknesses of each (upper and lower) gap of each reader (channel) is achieved.

Figure 6A:
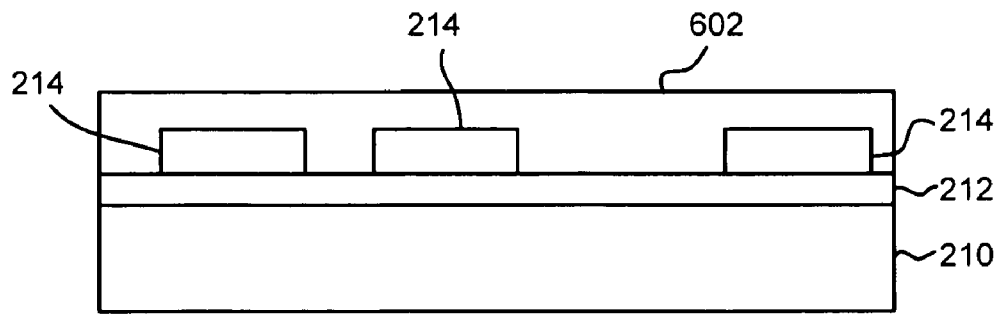
FIGS. 6A-H illustrate processing steps of a method for fabricating an array of readers having defined gap thicknesses according to one embodiment.
Figure 6B:
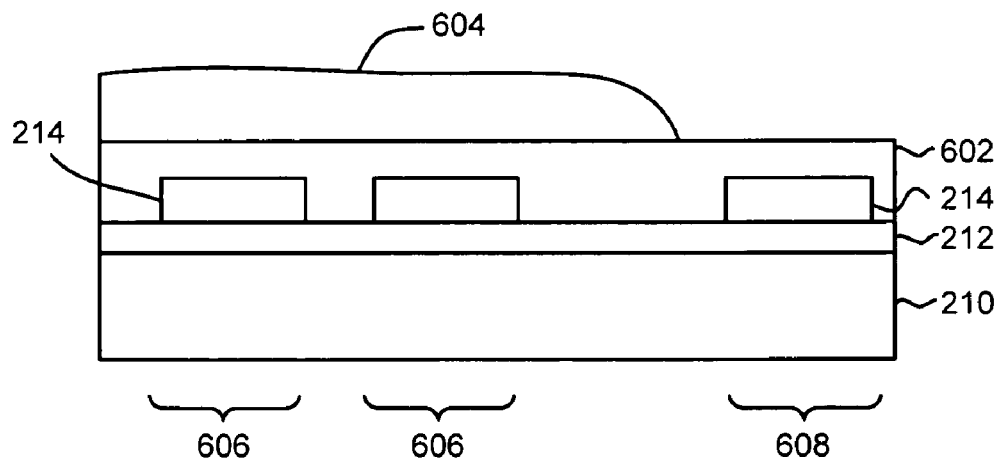
Figure 6C:
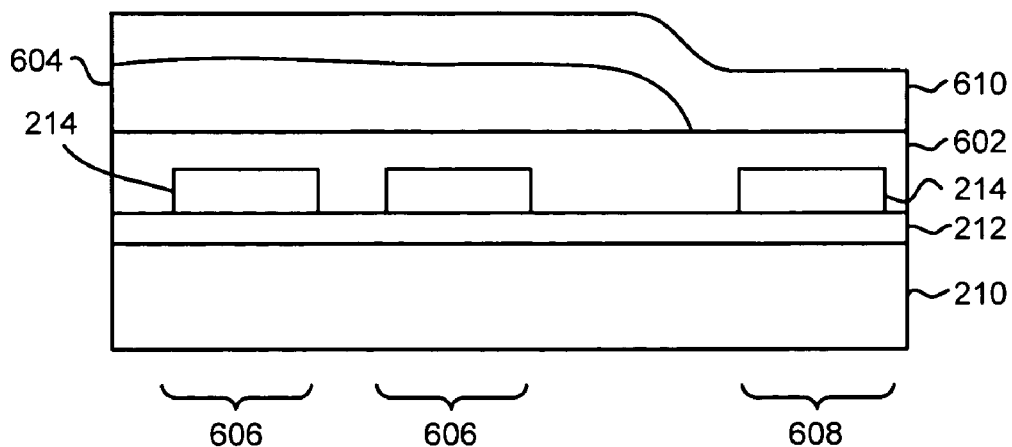
Figure 6D:
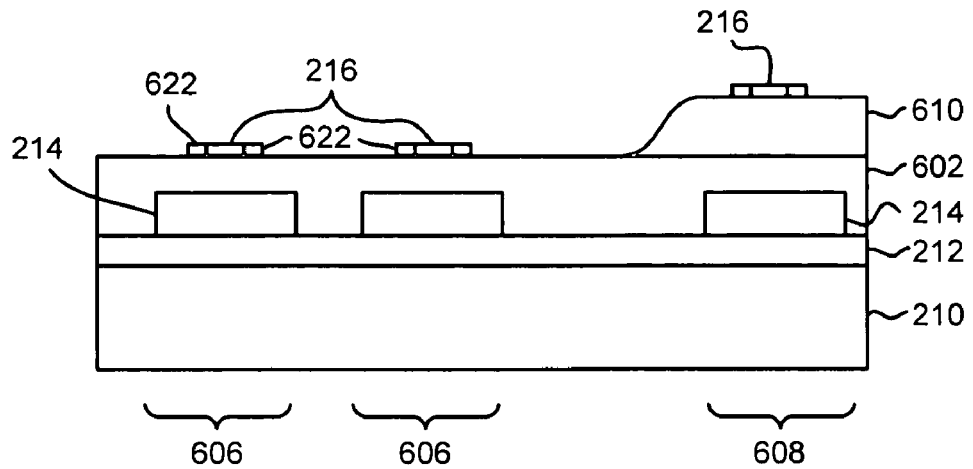

With reference to FIG. 6A, lower shields 214 for data and servo readers are formed on a substrate 210 and optional insulating layer 212 by conventional processes, such as photolithographic deposition or milling. A first lower gap layer 602 is deposited over the lower shields. The thickness of the first lower gap layer 602 is about the desired spacing between the lower shield and the sensor in the data readers. Referring to FIG. 6B, a mask 604 is formed at the sites 606 of the data readers but not at the sites 608 of the servo readers. The mask 604 may be formed, e.g., by standard photolithographic masking techniques using photoresist. As shown in FIG. 6C, a second lower gap layer 610 is formed above the exposed portions of the first lower gap layer 602 (at the servo reader sites) and the mask 604 until the desired lower gap thickness is achieved at the sites 608 of the servo readers. Referring to FIG. 6D, the mask 604 is removed, along with the gap material formed above it using a standard lift-off process, such as, for example, an organic solvent or aqueous alkali to dissolve a release layer and/or top resist layers, thereby releasing the deposited material over the mask. MR transducers (sensors) 216 and leads 622 are formed above the lower gaps via any desired conventional process. As is well known in the art, MR transducers and leads are typically formed by depositing layers of thin films of various compositions using a combination of photolithography, plating and deposition. The second lower gap layer 610 thus formed and patterned remains at the sites of the servo readers 608. The desired lower gap for the servo readers is comprised of the sum of the thicknesses of these first and second lower gap layers 602, 610, while the desired lower gap for the data readers is comprised of only the first lower gap layer 602.

Figure 6E:
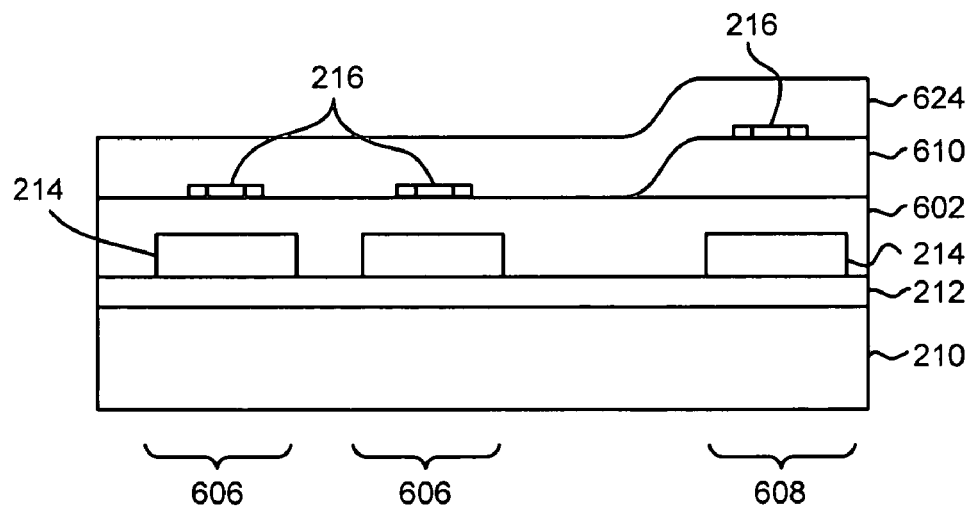
Figure 6F:
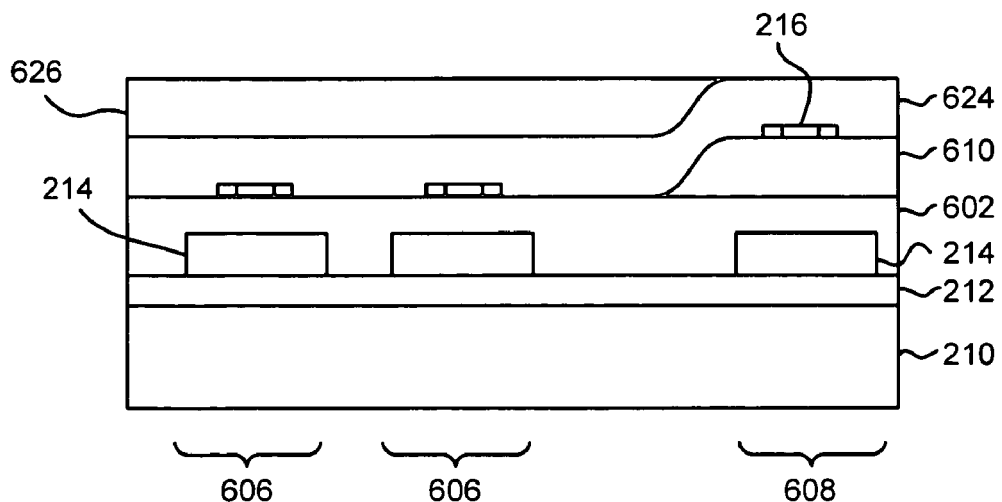
Figure 6G:
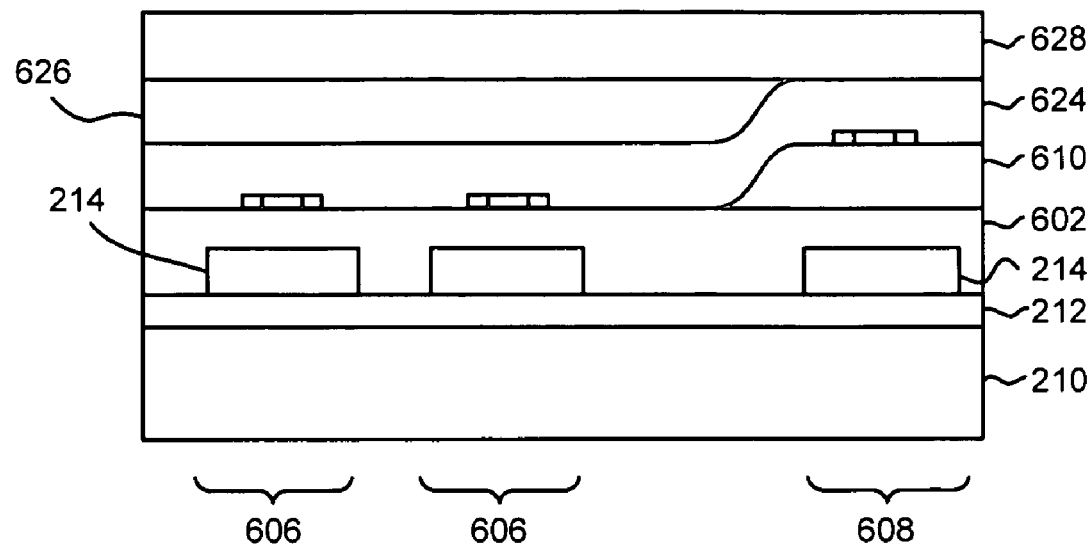
Figure 6H:
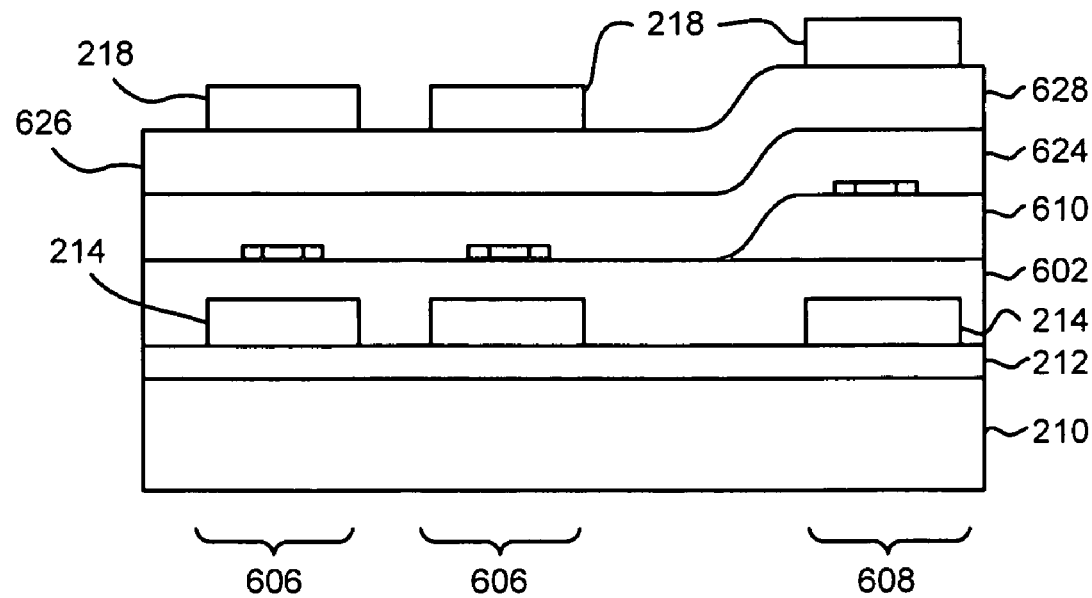

Referring to FIG. 6E, a first upper gap layer 624 is deposited on top of all of the MR transducers 216. Referring to FIG. 6F, a mask 626 is formed at the sites of the data readers but not at the sites of the servo readers. For example, raw masking material may be deposited over the entire structure. Areas over the data reader sites are exposed to radiation to cure the masking material. When the uncured masking material is removed, the cured portions of the mask remain over the sites of the data readers. As shown in FIG. 6G, a second upper gap layer 628 is formed above the exposed portions of the first upper gap layer 624 (sites of servo readers) and the mask 626 until the desired upper gap thickness is achieved at the sites 608 of the servo readers. Referring to FIG. 6H, the mask 626 is removed, along with the gap material formed above it using a standard lift-off process, such as, for example, using an organic solvent or aqueous alkali to dissolve a release layer and/or top resist layers, thereby releasing the deposited material over the mask. The desired upper gap for the servo readers is comprised of the sum of the thicknesses of the first and second upper gap layers 624, 628, while the desired upper gap for the data readers is comprised of only the first upper gap layer 624. Upper shields 218 are formed above the gaps via conventional processes.

While this example indicates only two varieties of channels and two pairs of uniquely designed gaps with each member of each pair comprised each of two gap depositions, the invention is intended to include a multiplicity of channel varieties and optimized gap thicknesses.

In practice, formation of the first lower and the second upper gaps may, in fact, coincide with and complement using "prefill" and "gapfill" gap deposition processes, where the first lower and second upper gaps (for example) provide added protection between MR leads and shields in regions of the shielded transducers where these gaps play no role in the magnetic detection process ("magnetically uninteresting areas"). In this embodiment the gaps formed as described herein play a direct magnetic role in the performance of the magnetic transducer (specifically, the servo channel readers, in this example). Thus, this invention may be fully achieved and implemented without added complexity to the head wafer building process (design change only, with no process change).

FIGS. 7A-K illustrate processing steps in a method for forming an array of readers according to one embodiment. According to this method, multiple layer thin film gaps are deposited on each side of each sensor in such a way that the desired thicknesses of each (upper and lower) gap of each reader (channel) is achieved.

For ease of understanding, this exemplary process assumes that the gap sizes of two groups of data readers (Groups A and B) are different, e.g., that the overall gap thicknesses of the data readers in Group A are greater than the overall gap thicknesses of the data readers in Group B, where a Group may include one or more data readers. This example also assumes that the gap of the servo readers is thicker than the gaps of the data readers in both Groups A and B.

Figure 7A:
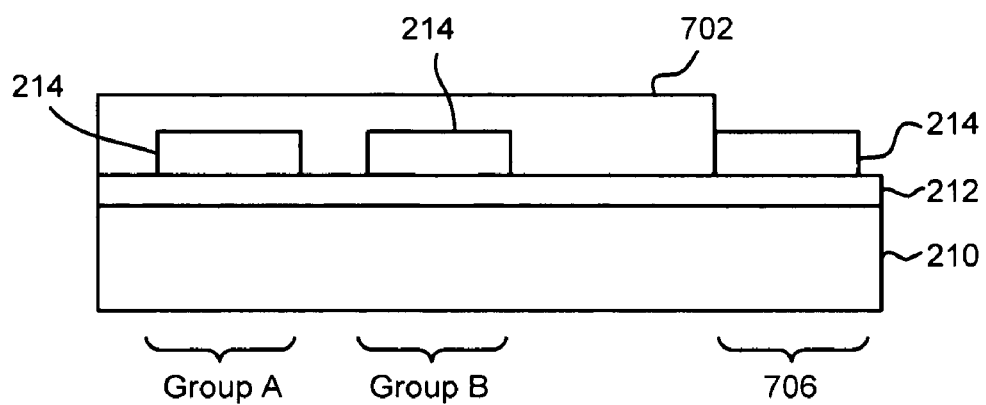
FIG. 7A-K illustrate processing steps of a method for fabricating an array of readers having defined gap thicknesses according to another embodiment.
Figure 7B:
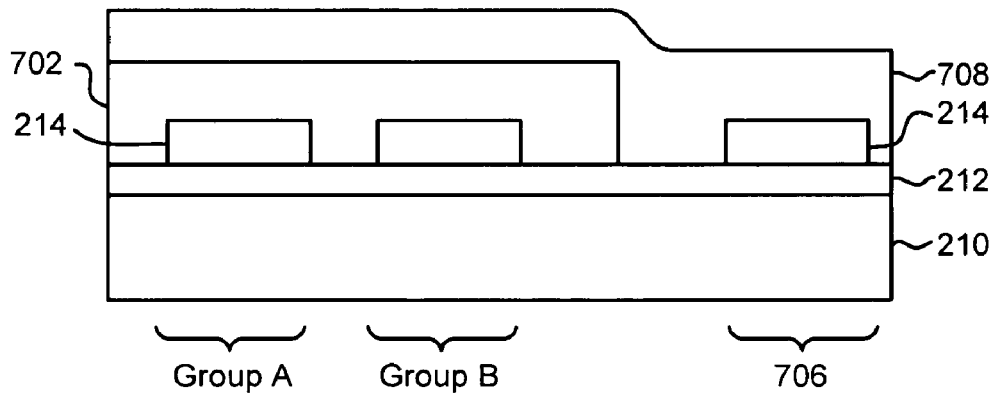
Figure 7C:
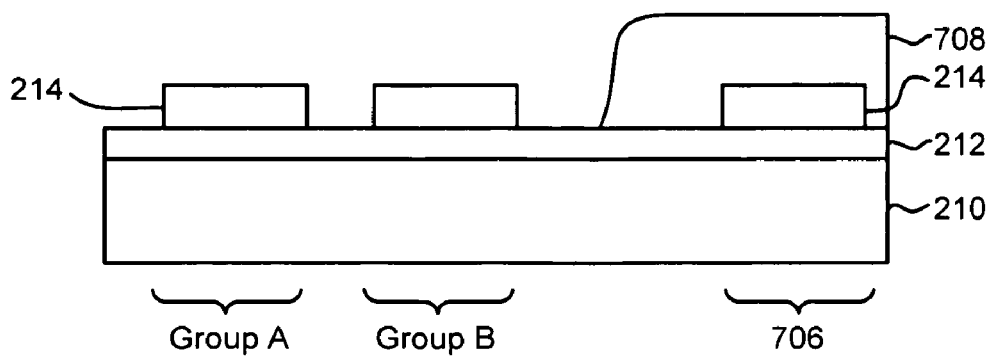
Figure 7D:
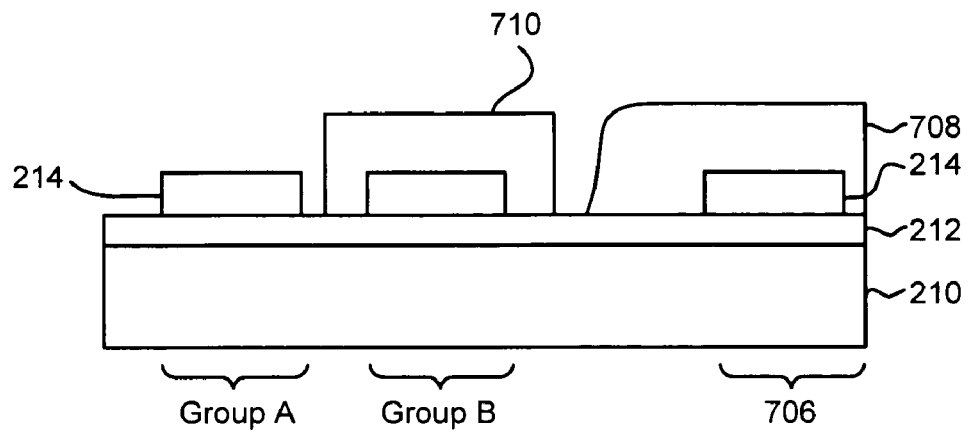
Figure 7E:
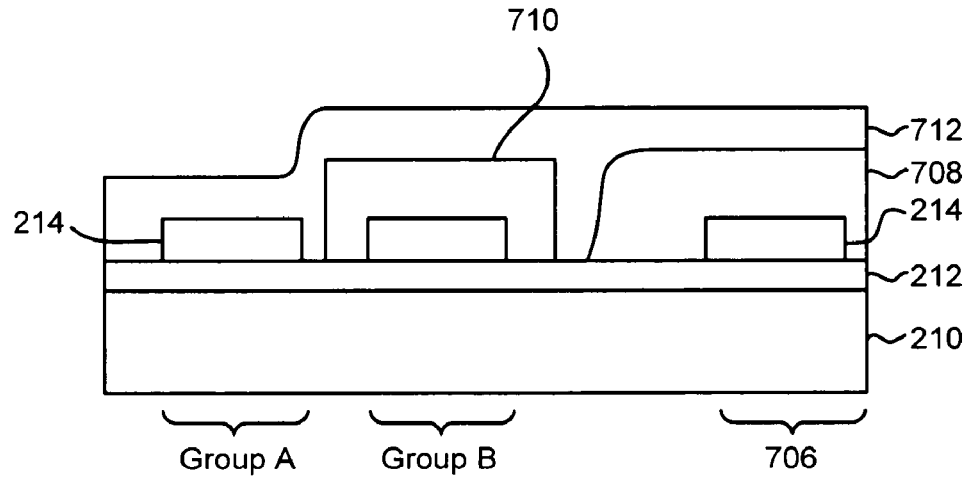

With reference to FIG. 7A, lower shields 214 for data and servo readers are formed on a substrate 210 and optional insulating layer 212 by conventional processes, such as photolithographic deposition or milling. A mask 702 is formed at the data reader sites (Groups A and B) but not at the servo reader sites 706. For example, the unexposed masking material may be deposited over the entire structure, and areas over the sites in Group B are exposed to cure the masking material. When the uncured material is removed, the cured portions of the mask remain at the desired sites. The mask 702 may be formed by, e.g., standard photolithographic masking techniques. Referring to FIG. 7B, a first lower gap layer 708 is deposited over the exposed lower shields 214 and mask 702. As shown in FIG. 7C, the mask 702 and any material thereover is removed using a standard lift-off process, such as, for example, an organic solvent or aqueous alkali to dissolve a release layer and/or top resist layers, thereby releasing the deposited material over the mask. As shown in FIG. 7D, a second mask 710 is formed on the data reader sites in Group B but not at the servo reader sites nor at the data reader sites of Group A, e.g., using standard photolithographic masking techniques to selectively define the mask over the desired sites. For example, the unexposed masking material may be deposited over the entire structure, and areas over the sites in Group B are exposed to cure the masking material. When the uncured material is removed, the cured portions of the mask remain at the desired sites. Referring to FIG. 7E, a second lower gap layer 712 is formed over the first lower gap layer 708 (at the sites 706 of the servo readers), second mask 710 over Group B and the now exposed shields 214 of the data readers in Group A.

Figure 7F:
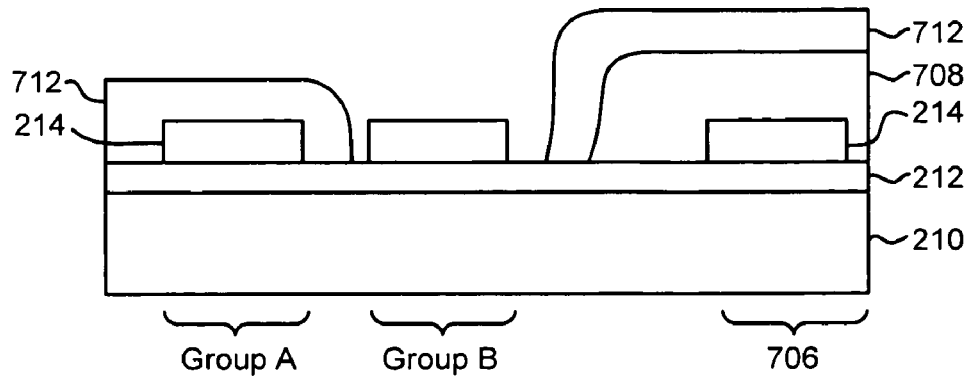
Figure 7G:
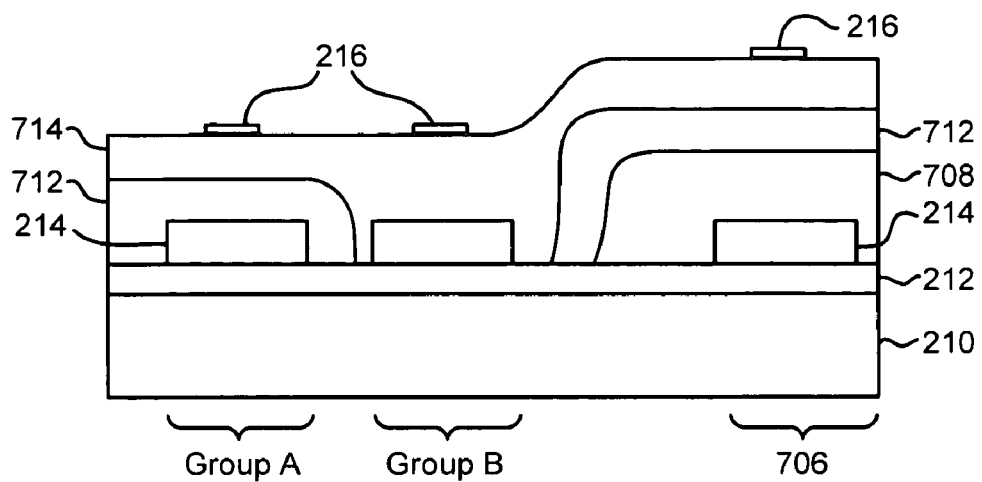

Referring to FIG. 7F, the second mask 710 and any material thereover is removed using a standard lift-off process, such as, for example, using an organic solvent or aqueous alkali to dissolve a release layer and/or top resist layers, thereby releasing the deposited material over the mask. As can be seen in FIG. 7F, the data readers of Group B do not have any gap material deposited over them so far. As shown in FIG. 7G, a third lower gap layer 714 is formed above all the reader sites until the desired lower gap thickness is achieved at the sites of the data readers. In other words, the thickness of the second lower gap layer 712 is about the desired spacing between the lower shield and the sensor in the data readers of Group B. MR transducers (sensors) 216 and leads (not shown) are formed above the lower gaps via conventional processes. As is well known in the art, MR transducers and leads are typically formed by depositing layers of thin films of various composition using a combination of photolithography, plating and deposition. The thickness of the second lower gap layer is about the desired spacing between the lower shield 214 and the sensor 216 in the data readers. The desired lower gap for the servo readers is comprised of the sum of the thicknesses of the first, second and third lower gap layers 708, 712, 714, the desired lower gap for the data readers in Group A is comprised of the second and third lower gap layers 712, 714, while the desired lower gap for the data readers in Group B is comprised of only the third lower gap layer 714.

Figure 7H:
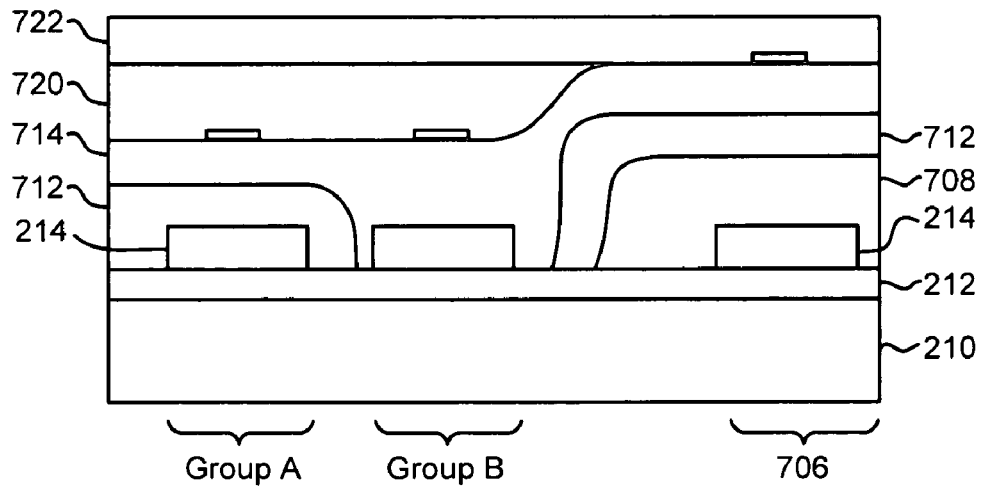
Figure 7I:
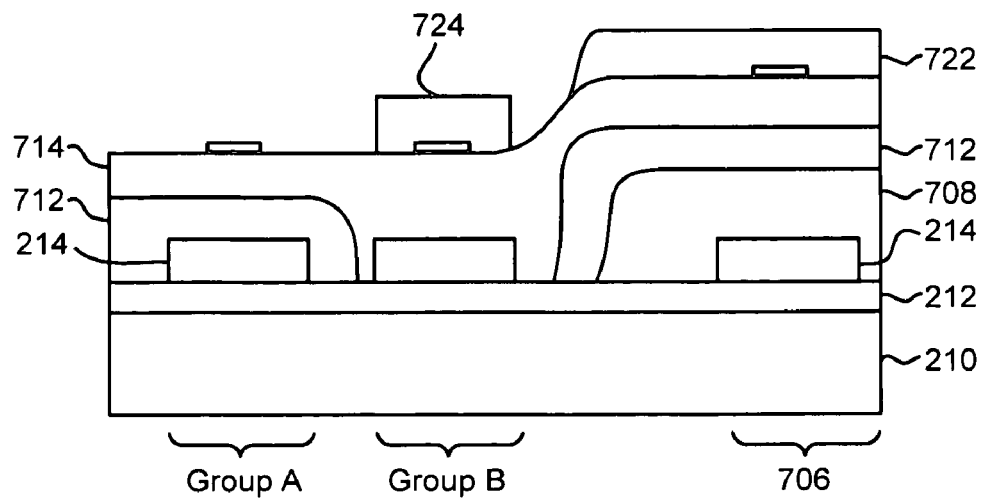
Figure 7J:
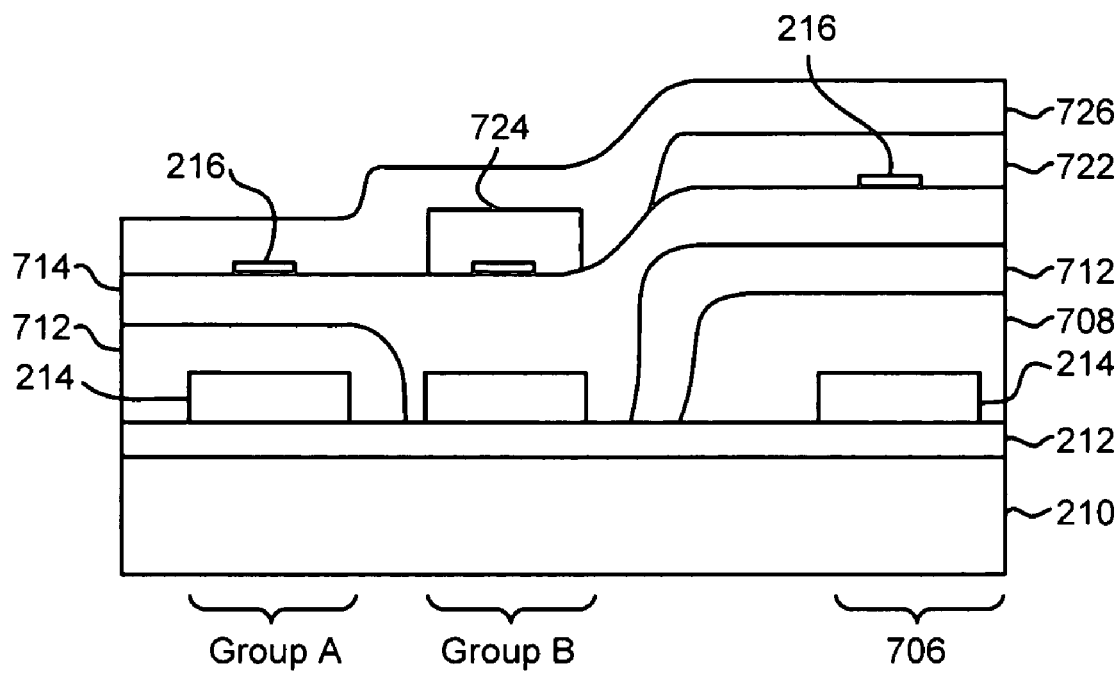

Referring to FIG. 7H, a first upper mask 720 is formed at the data reader sites of both Groups but not at the servo reader sites. For example, raw masking material may be deposited over the entire structure. Areas over the desired sites are exposed to cure the masking material. When the uncured masking material is removed, the cured portions of the mask remain over the desired sites. A first upper gap layer 722 is then deposited over the exposed sensors 216 and mask 720. Referring to FIG. 7I, the mask 720 and any material above it are removed using a standard lift-off process, such as, for example, using an organic solvent or aqueous alkali to dissolve a release layer and/or top resist layers, thereby releasing the deposited material over the mask. A second upper mask 724 is formed over the data reader sites in Group B but not at the servo reader sites nor at the data reader sites of Group A. For example, raw masking material may be deposited over the entire structure. Areas over the desired sites are exposed to cure the masking material. When the uncured masking material is removed, the cured portions of the mask remain over the desired sites. As shown in FIG. 7J, a second upper gap layer 726 is formed above the first upper gap layer 722 (at sites of the servo readers), over layer 724 in Group B, and the exposed sensors 216 of the data readers in Group A.

Figure 7K:
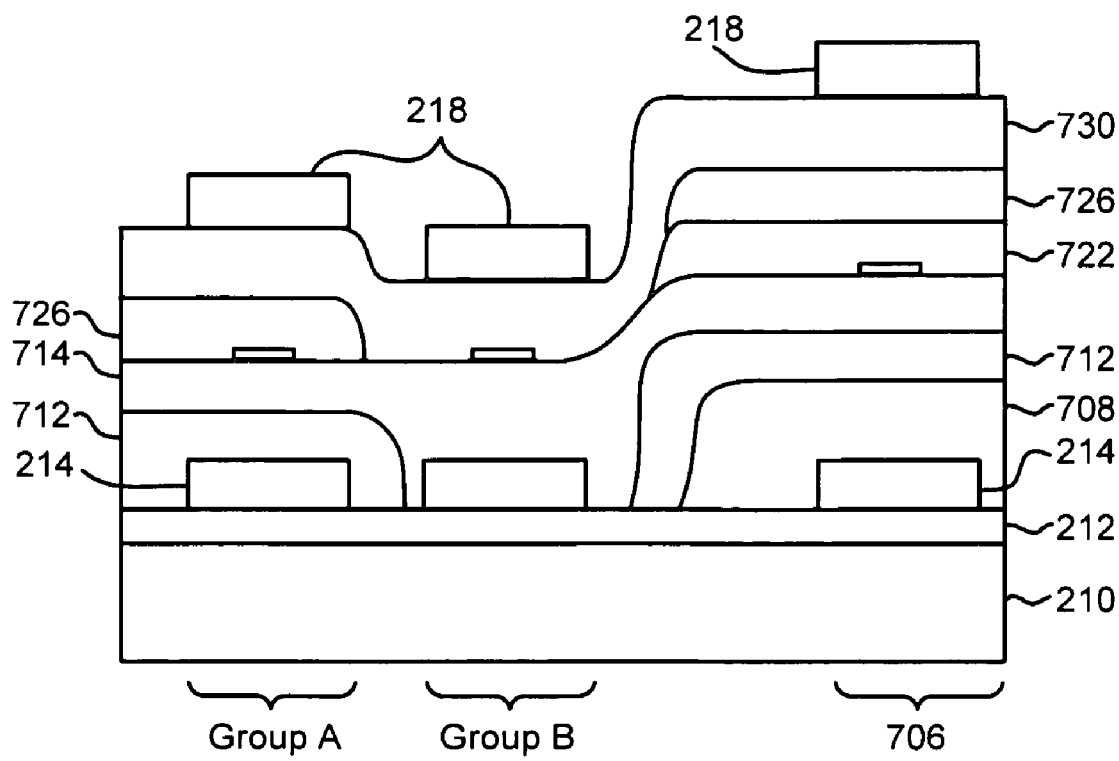

As shown in FIG. 7K, the second upper mask 724 and any material thereover is removed using a standard lift-off process, such as, for example, using an organic solvent or aqueous alkali to dissolve a release layer and/or top resist layers, thereby releasing the deposited material over the mask. A third upper gap layer 730 is formed above all the reader sites until the desired upper gap thickness is achieved at the sites of the data readers. Upper shields 218 are formed above the gaps via conventional processes, such as photolithographic deposition or milling.

One practicing the invention will appreciate that the various steps can be repeated additional times to define gap thicknesses of additional Groups of data readers.

FIGS. 8A-G illustrate processing steps in a method for forming an array of readers according to one embodiment. According to this method, single layer thin film gaps are deposited on each side of each sensor and portions thereof removed, e.g., by milling.

Figure 8A:
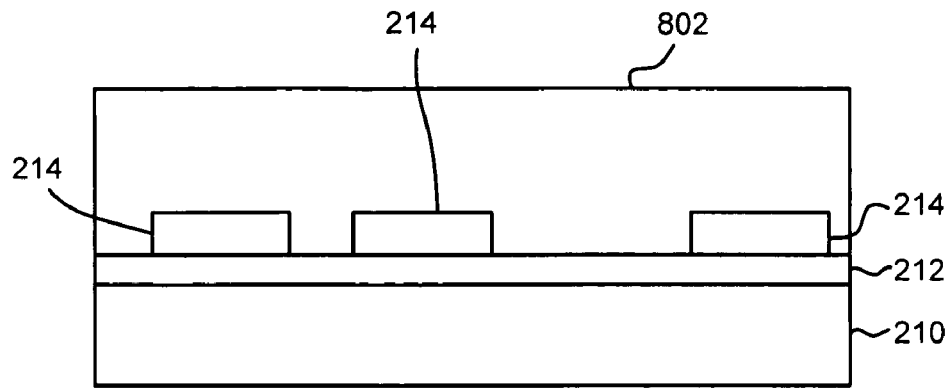
FIGS. 8A-G illustrate processing steps of a method for fabricating an array of readers having defined gap thicknesses according to yet another embodiment.
Figure 8B:
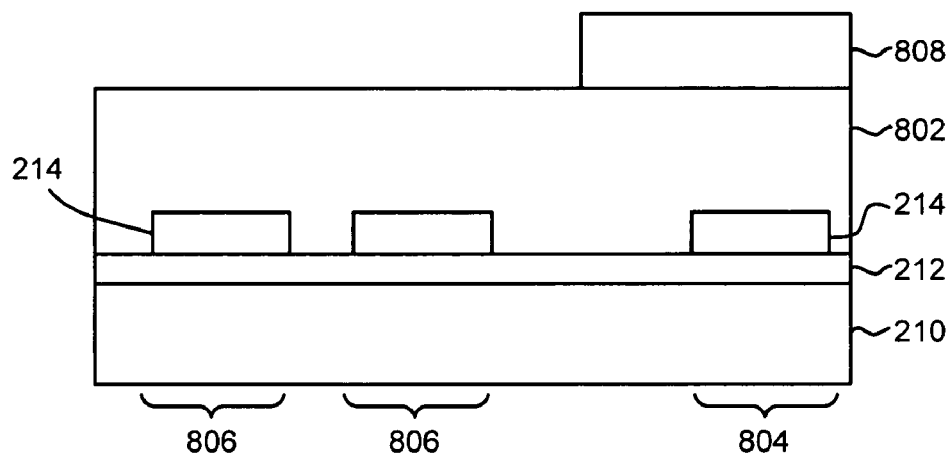
Figure 8C:
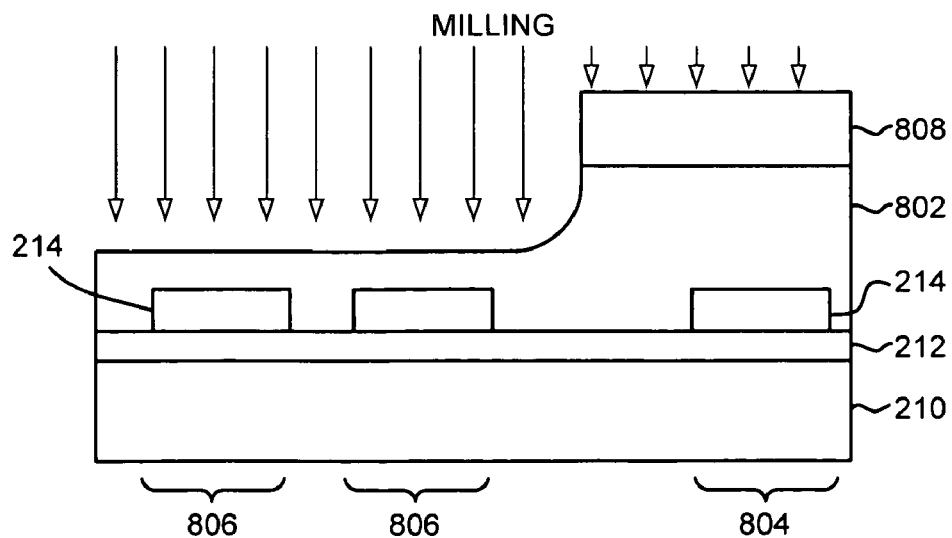
Figure 8D:
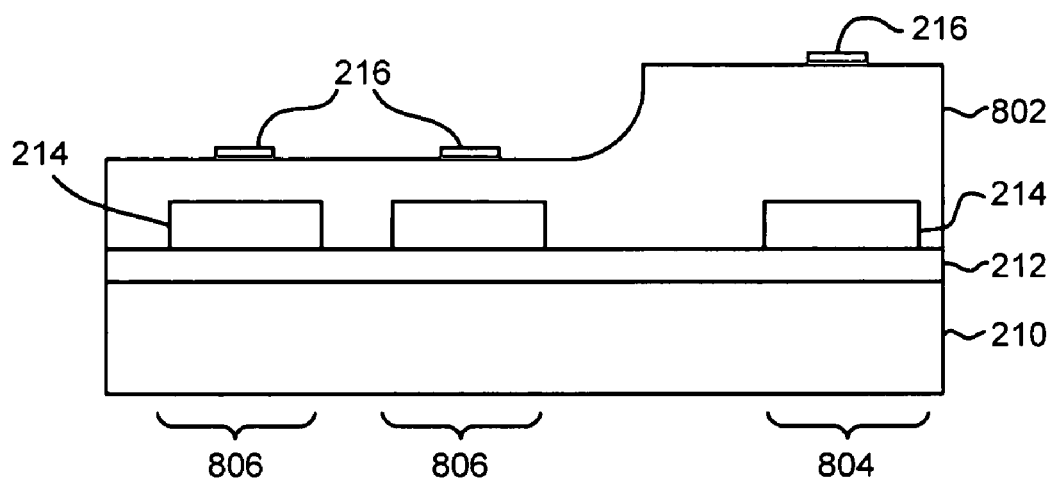
Figure 8E:
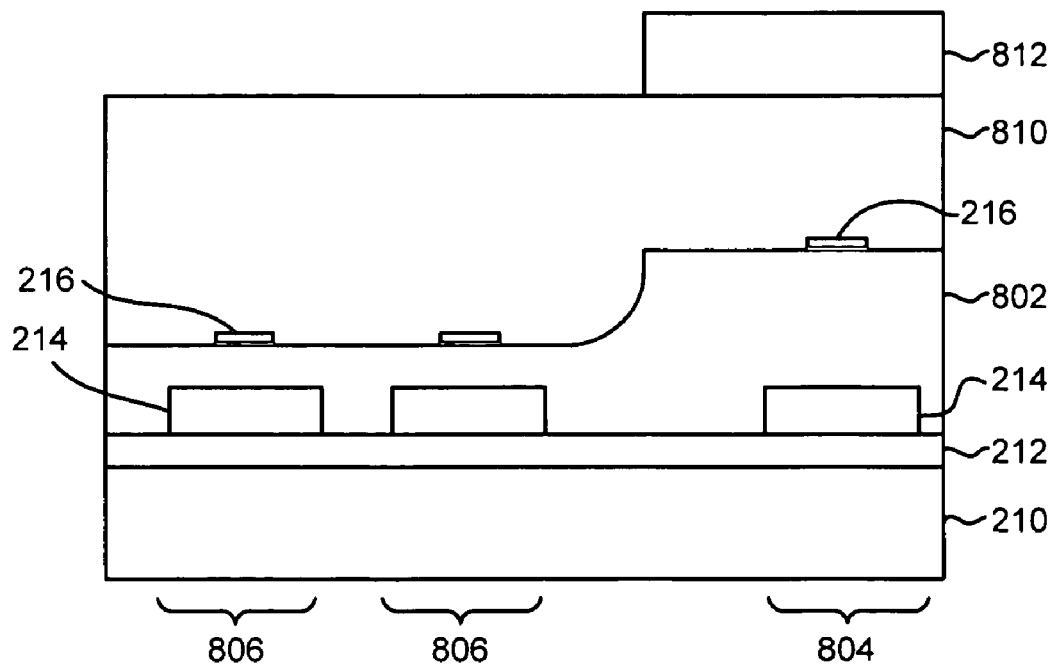
Figure 8F:
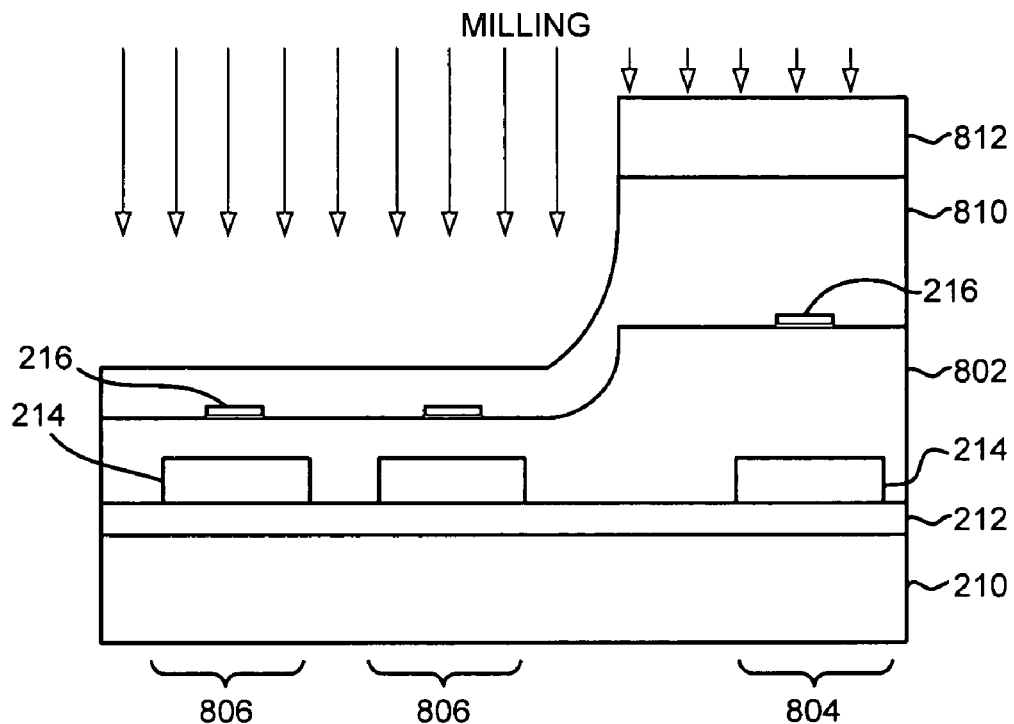
Figure 8G:
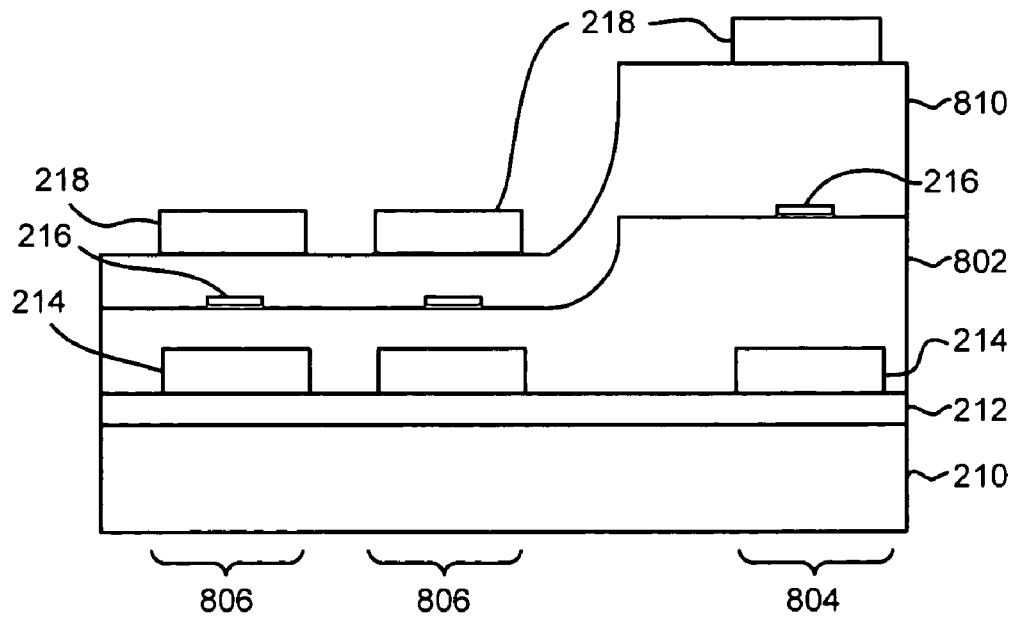

With reference to FIG. 8A, lower shields 214 for data and servo readers are formed on a substrate 210 and optional insulating layer 212. As is well known in the art, shields are typically formed using a combination of photolithography to define the shield and plating or deposition to add the material. A lower gap layer 802 is deposited over the lower shields 214. The thickness of the lower gap layer 802 is about the desired spacing between the lower shield and the sensor in the servo readers. Referring to FIG. 8B, a mask 808 is formed above the sites 804 of the servo readers but not at the sites 806 of the data readers. For example, raw masking material may be deposited over the entire structure. Areas over the desired sites are exposed to cure the masking material. When the uncured masking material is removed, the cured portions of the mask remain over the desired sites. Referring to FIG. 8C, the exposed portions of the lower gap layer 802 are removed, for example by ion milling or polishing, until the desired lower gap thickness is achieved at the exposed sites 806 of the data readers. Referring to FIG. 8D, the mask 808 is removed using a standard lift-off process, such as, for example, using an organic solvent or aqueous alkali to dissolve a release layer and/or top resist layers, thereby releasing the deposited material over the mask. MR transducers (sensors) 216 and leads (not shown) are formed above the lower gaps via conventional processes. As is well known in the art, MR transducers and leads are typically formed by depositing layers of thin films of various composition using a combination of photolithography, plating and deposition. Referring to FIG. 8E, an upper gap layer 810 is deposited on top of all of the MR transducers 216 until the desired upper gap thickness is achieved at the sites of the servo readers. A mask 812 is formed on the sites 804 of the servo readers but not at the sites 806 of the data readers. For example, raw masking material may be deposited over the entire structure. Areas over the desired sites are exposed to cure the masking material. When the uncured masking material is removed, the cured portions of the mask remain over the desired sites. Referring to FIG. 8F, the portions not covered by the upper mask are removed, for example by ion milling or polishing, until the desired upper gap thickness is achieved at the exposed sites of the data readers. Referring to FIG. 8G, the mask 812 over sites 804 is removed using a standard lift-off process, such as, for example, using an organic solvent or aqueous alkali to dissolve a release layer and/or top resist layers, thereby releasing the deposited material over the mask. Upper shields 218 are formed above the gaps via conventional processes. As is well known in the art, shields are typically formed using a combination of photolithography to define the shield and plating or deposition to add the material.

A variation of the method of FIG. 8 can also be used to define gap thicknesses of individual data readers by adding processing steps to mask some of the data readers but not others. Gap material is removed from unmasked regions, e.g., by milling. Then the mask is removed. A second mask is then applied only above the sites of the servo readers and possibly above one or more of the data readers. Then gap material is removed from the exposed regions. Additional cycles of masking and removing material can be performed until groups of data readers (which may include individual data readers) have gaps of the desired thicknesses.

FIGS. 9A-F illustrate processing steps in a method for forming an array of readers according to another embodiment. According to this method, single layer thin film gaps are deposited on each side of each sensor in such a way that the desired thicknesses of each (upper and lower) gap of each reader (channel) is achieved.

Figure 9A:
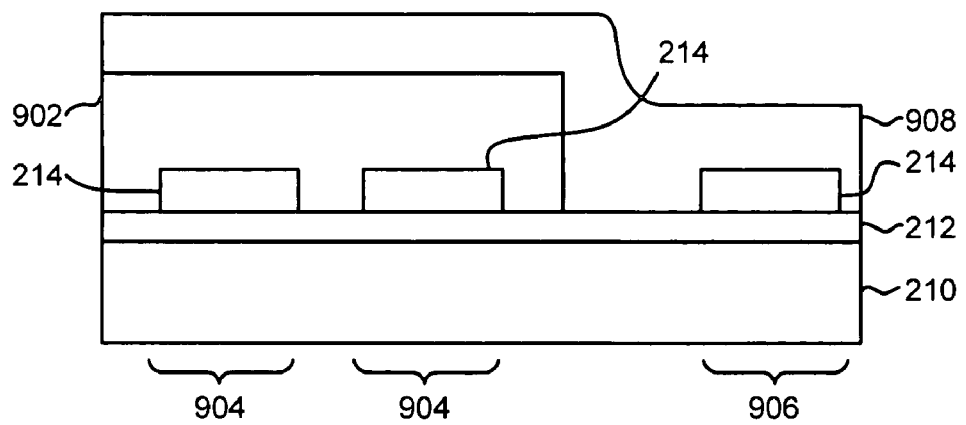
FIGS. 9A-F illustrate processing steps of a method for fabricating an array of readers having defined gap thicknesses according to yet another embodiment.
Figure 9B:
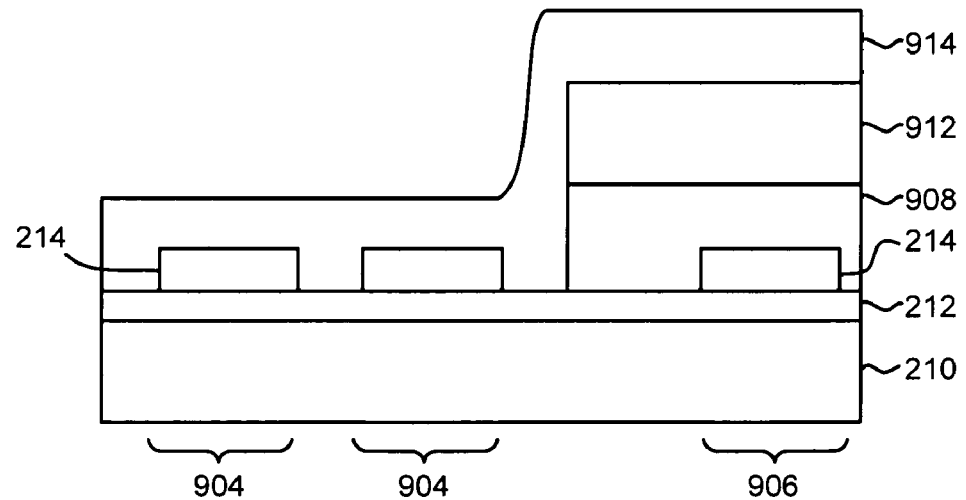
Figure 9C:
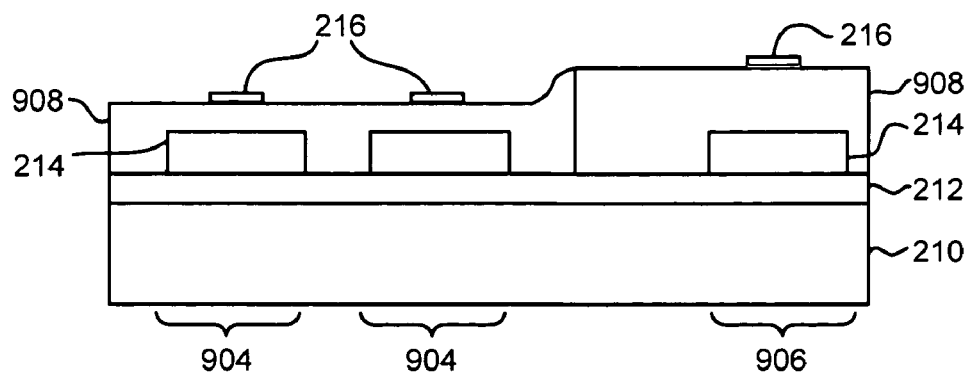

With reference to FIG. 9A, lower shields 214 for data and servo readers are formed on a substrate 210 and optional insulating layer 212. As is well known in the art, shields are typically formed using a combination of photolithography to define the shield and plating or deposition to add the material. A first mask 902 is formed on the sites 904 of the data readers but not at the sites 906 of the servo readers. The first mask 902 may be formed, e.g., by standard photolithographic masking techniques using photoresist. For example, raw masking material may be deposited over the entire structure. Areas over the desired sites are exposed to cure the masking material. When the uncured masking material is removed, the cured portions of the mask remain over the desired sites. A layer 908 of a gap material is deposited to a first thickness above exposed areas not covered by the first mask 902. This defines the lower servo gap layer. Referring to FIG. 9B, the first mask is removed, along with any gap material formed above it, e.g., using a standard lift-off process such as, for example, using an organic solvent or aqueous alkali to dissolve a release layer and/or top resist layers, thereby releasing the deposited material over the mask. A second mask 912 is formed on the sites 906 of the servo readers, i.e., above the lower gap layer now defined thereon. The sites 904 of the data readers are now exposed. A second layer 914 of gap material is formed to a second thickness above the exposed areas not covered by the second mask 912. This defines the lower gap layer for the data readers. Referring to FIG. 9C, the second mask is removed, along with the gap material formed above it using a standard lift-off process, such as, for example, using an organic solvent or aqueous alkali to dissolve a release layer and/or top resist layers, thereby releasing the deposited material over the mask. MR transducers (sensors) 216 and leads (not shown) are formed above the lower gaps via conventional processes. As is well known in the art, MR transducers and leads are typically formed by depositing layers of thin films of various compositions using a combination of photolithography, plating and deposition.

Figure 9D:
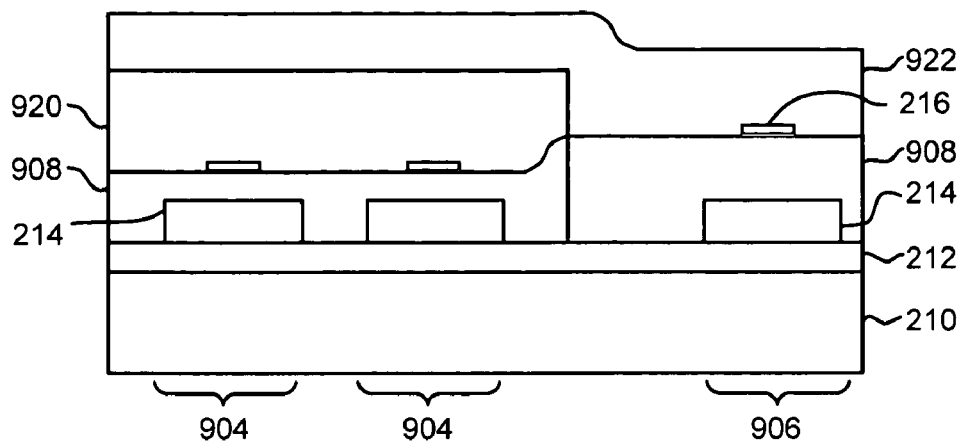
Figure 9E:
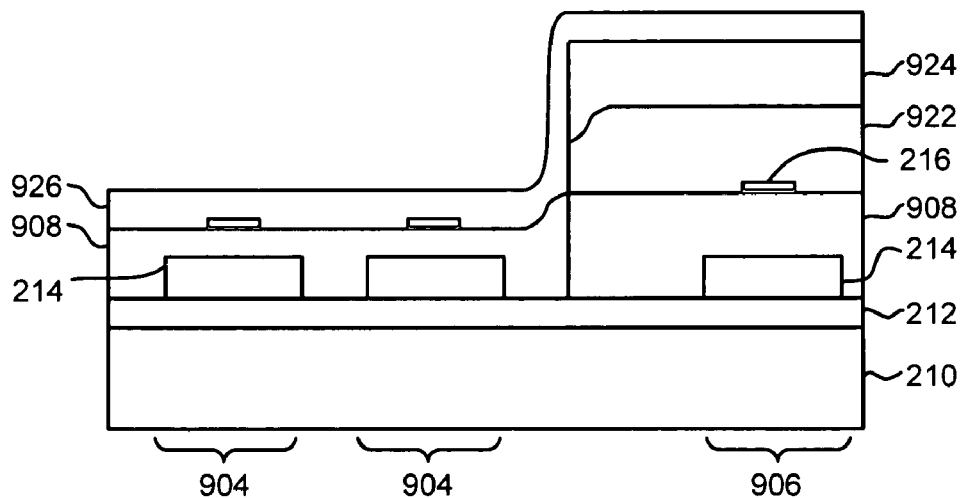
Figure 9F:
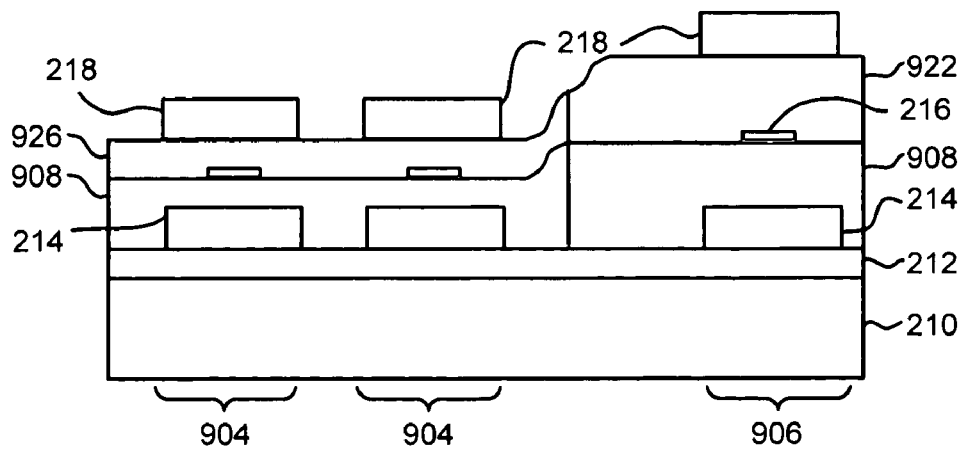

Referring to FIG. 9D, a third mask 920 is formed on the sites 904 of the data readers but not at the sites 906 of the servo readers. A layer 922 of a gap material is deposited to a third thickness above exposed areas not covered by the third mask 920. This defines the upper servo gap layer. Referring to FIG. 9E, the third mask is removed, along with any gap material formed above it, e.g., using a standard lift-off process such as, for example, using an organic solvent or aqueous alkali to dissolve a release layer and/or top resist layers, thereby releasing the deposited material over the mask. A fourth mask 924 is formed on the sites 906 of the servo readers, i.e., above the upper gap layer now defined thereon. The sites 904 of the data readers are now exposed. A fourth layer 926 of gap material is formed to a fourth thickness above the exposed areas not covered by the fourth mask 924. This defines the upper gap layer for the data readers. Referring to FIG. 9F, the fourth mask is removed, along with the gap material formed above it using a standard lift-off process, such as, for example, using an organic solvent or aqueous alkali to dissolve a release layer and/or top resist layers, thereby releasing the deposited material over the mask. Upper shields 218 are formed above the gaps via conventional processes. As is well known in the art, shields are typically formed using a combination of photolithography to define the shield and plating or deposition to add the material.

Again, it must be stressed that the invention is intended to include a multiplicity of channel varieties and optimized gap thicknesses, including varying the gap size on some data readers to optimize performance of those data readers. In that case, the processes can be modified to purposely pattern, deposit, remove, etc. gap material for certain readers and not others to provide gaps of varying thicknesses.

It should also be understood that in the various embodiments and permutations, for a particular reader, the lower gap layer may be a multi-layer structure while the upper gap layer is a single-layer structure. The opposite may also be true, where the lower gap layer is a single-layer structure while the upper gap layer is a multi-layer structure.

Also, in piggyback configurations, to ensure that the data writers all write in a line across the width of the tape, the lower pole tips should be aligned laterally. While some of the underlying readers may have a thicker gap, and thus a higher upper shield relative to other readers, the material above the upper shields can be planarized via CMP, etc. Thus, the spacing between the upper shield and the lower pole tip immediately thereover may also vary, but the lower pole tips will be laterally aligned.

There has thus been described various methods for modifying existing processes to independently define gap thickness, as well as using additional processing steps to independently define the gap thicknesses on a per-reader basis.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   a plurality of generally laterally positioned readers, each reader having a sensor with upper and lower surfaces, a lower shield below the sensor, an upper shield above the sensor, and a gap defined between opposing surfaces of the shields,
   wherein at least one of the readers has a thicker gap than another of the readers,
   wherein the lower surface of the sensor of the reader having the thicker gap lies along a plane that is offset from and higher than a plane along which the lower surface of the sensor of the reader not having the thicker gap.

2. The head as recited in claim 1, wherein the readers include data readers and a servo reader, wherein the servo reader has a thicker gap than the data readers.

3. The head as recited in claim 2, wherein planes of deposition of each of the plurality of readers are about parallel with respect to one another.

4. The head as recited in claim 1, wherein the readers include multiple data readers and at least one servo reader, wherein at least one of the data readers has a thicker gap than another of the data readers.

5. The head as recited in claim 1, wherein the gap of each reader includes a single layer lower gap layer formed between the lower shield and the sensor, and a single layer upper gap layer formed between the upper shield and the sensor.

6. The head as recited in claim 1, wherein the thicker gap includes at least one of a multilayer lower gap layer formed between the lower shield and the sensor, and a multilayer upper gap layer formed between the upper shield and the sensor.

7. A tape drive system comprising:
   a head as recited in claim 6;
   a drive mechanism for passing a magnetic recording tape over the head; and
   a controller in communication with the head,
   wherein the at least one of the multilayer lower gap layer and the multilayer upper gap layer includes a layer of nonmagnetic metal, wherein the readers include data readers and a servo reader, wherein the servo reader has a thicker gap than the data readers, wherein planes of deposition of each of the plurality of readers are about parallel with respect to one another.

8. A tape drive system, comprising:
   a head as recited in claim 1;
   a drive mechanism for passing a magnetic recording tape over the head; and
   a controller in communication with the head.

9. The head as recited in claim 1, wherein the shields are formed of a magnetic shielding material.

10. The head as recited in claim 1, wherein the readers include multiple data readers and at least one servo reader, wherein at least one of the data readers has a thicker gap than another of the data readers, wherein the thicker gap includes at least one of a multilayer lower gap layer formed between the lower shield and the sensor and a multilayer upper gap layer formed between the upper shield and the sensor, wherein the at least one of the multilayer lower gap layer and the multilayer upper gap layer includes a layer of nonmagnetic metal.

11. A magnetic tape head, comprising:
a plurality of generally laterally aligned readers, the readers including data readers and at least one servo reader, each reader having a lower shield, a lower gap layer above the lower shield, a sensor above the lower gap layer, an upper gap layer above the sensor, and an upper shield above the upper gap layer,
wherein an overall gap thickness of each reader is defined between opposing surfaces of the shields,
wherein at least one of the readers has a greater overall gap thickness than another of the readers,
wherein a lower surface of the upper shield of the reader having the greater overall gap thickness lies along a plane that is offset from and higher than a plane extending along a lower surface of the upper shield of the reader not having the greater overall gap thickness.

12. The head as recited in claim 11, wherein the gap of the at least one servo reader has a greater thickness than the data reader gaps.

13. The head as recited in claim 12, wherein the overall gap thickness of the servo reader is at least 1.5 times the thickness of the data reader gaps.

14. The head as recited in claim 11, wherein at least one of the data readers has a greater overall gap thickness than another of the data readers.

15. The head as recited in claim 11, wherein, for the at least one of the readers having the greater overall gap thickness, the lower gap layer is a unitary structure, and the upper gap layer is a unitary structure.

16. A tape drive system comprising:
a head as recited in claim 11;
a drive mechanism for passing a magnetic recording tape over the head; and
a controller in communication with the head,
wherein the gap of the at least one servo reader has a greater thickness than the data reader gaps,
wherein the overall gap thickness of the servo reader is at least 1.5 times the thickness of the data reader gaps,
wherein, for the at least one of the readers having the greater overall gap thickness, at least one of the lower gap layer and the upper gap layer is a multilayer structure.

17. A tape drive system, comprising:
a head as recited in claim 11;
a drive mechanism for passing a magnetic recording tape over the head; and
a controller in communication with the head.

18. The head as recited in claim 11, wherein the shields are formed of a magnetic shielding material.

19. The head as recited in claim 11, wherein at least one of the data readers has a greater overall gap thickness than another of the data readers, wherein for the at least one of the readers having the greater overall gap thickness, at least one of the lower gap layer and the upper gap layer is a multilayer structure.

* * * * *